Patented Jan. 10, 1939

2,143,394

UNITED STATES PATENT OFFICE 2,143,394

SULPHUR DYES

Paul Virck, Wolfen, Kreis Bitterfeld, Germany, assignor to General Aniline Works, Inc., New York, N. Y., a corporation of Delaware No Drawing. Application January 22, 1936, Serial No. 60,196. In Germany January 29, 1935

1 Claim. (Cl. 260—133)

It is known that by the action of sulphurizing agents on 4-hydroxydiarylamines dyes of remarkable properties of fastness can be made. They dye cotton in alkali metal sulphide baths red-brown, dark violet to black shades.

This invention relates to the manufacture of equally valuable sulphur dyes by conducting the sulphurization of a 4-hydroxyphenylarylamine in two stages. In the first stage the hydroxyphenylarylamine is heated with concentrated alkali metal sulphide solution and sulphur, or with an alkali metal polysulphide, or with sulphur alone, at a high temperature and the reaction is finished in the second stage, which occurs at ordinary or raised pressure in the presence of an alcohol of high boiling point. When the hydroxyphenylarylamine is heated with sulphur alone, preferably in the presence of a catalyst, such as iodine, alkali metal sulphide should be added in the second stage. Particularly suitable media for the reaction are the alcohols of high boiling point belonging to the aliphatic series, particularly commercial butyl alcohol of boiling point about 116° C.; also cyclic alcohols, for instance wholly or partially hydrogenized derivatives of aromatic hydroxy-compounds, especially cyclohexanol. The use of alcohols of high boiling point has the particular advantage that they lead to an essential reduction of the duration of the reaction and also make it possible to use less sodium sulphide and sulphur.

In the second stage of the process an oxidizing agent, for instance sodium nitrite, may be added in the known manner.

Furthermore, there may be added to the mass in either of the two stages an aromatic nitro-, amino- or hydroxy- compound to influence the shade of the dyeing produced.

The following examples illustrate the invention, the parts being by weight:—

Example 1.—100 parts of sulphur are heated to fusion with 50 parts of sodium sulphide conc. whereupon 100 parts of 4'-hydroxyphenyl-2-aminonaphthalene are introduced into the mass. The whole is heated, while stirring, for 1–2 hours at a temperature of 130–170° C. and there are then added 400–500 parts of butyl alcohol and the whole is boiled in a reflux apparatus for about 3–4 hours. The butyl alcohol is then distilled. The pulverulent dye remaining is worked up in the usual manner and is easily soluble in dilute sodium sulphide solution and dyes cotton in a sodium sulphide bath deep black.

By the addition of 5 parts of 4,4'-dihydroxydiphenylamine to the melt a blue-black is obtained.

Example 2.—100 parts of sulphur are fused with 100 parts of 4'-hydroxyphenyl-2-aminonaphthalene and the mass is heated for some 3 hours at an oil-bath temperature of 150–210° C., while stirring. At this stage it is advantageous to add some iodine. 45 parts of sodium sulphide conc. are now added to the mass, followed by 400–500 parts of butyl alcohol. The mass is then boiled for about 3 hours in a reflux apparatus and further worked up as described in Example 1. The dye corresponds with that of Example 1.

Example 3.—In manner similar to that described in the preceding examples a dye may be made from 4'-hydroxy-3'-carboxyphenyl-2-aminonaphthalene. It dyes cotton tints that are somewhat greener than those obtained with the dye of Example 1.

Example 4.—95 parts of sulphur are melted with 100 parts of 4'-methyl-4-hydroxydiphenylamine and the mass is heated for 3–4 hours in the oil-bath of 130–190° C. Here also it is advantageous to add some iodine. There are now introduced into the mass 70 parts of sodium sulphide conc. and 750 parts of butyl alcohol. Boiling in an reflux apparatus for 5 hours and working up as described in Example 1 follows. The dye dissolves in sodium sulphide solution and dyes cotton red-brown tints.

In the foregoing examples the sulphurization of 4'-hydroxyphenyl-2-aminonaphthalenes is described. In the same manner I may use the corresponding derivatives of 1-aminonaphthalene, and thus for instance 4'-hydroxyphenyl-1-aminonaphthalene, 4'-hydroxy-3'-carboxyphenyl-1-aminonaphthalene, or other 1-aminonaphthalenes substituted in the amino group by a 4-hydroxyphenyl radical yield dyes of similar properties. In the examples butyl alcohol is added in the last stage of sulphurization. As pointed out above I may add another aliphatic alcohol of boiling point about 116° C. or a wholly or partially hydrogenized aromatic hydroxy-compound.

What I claim is:—

The process which comprises heating 4'-hydroxyphenyl-2-aminonaphthalene with an alkali metal polysulphide to a temperature of about 130° C. to about 170° C., adding commercial butyl alcohol and boiling the mixture under reflux, in the course of this process 4,4'-dihydroxydiphenylamine being introduced into the mixture.

PAUL VIRCK.